(12) United States Patent
Hatano et al.

(10) Patent No.: US 11,513,421 B2
(45) Date of Patent: Nov. 29, 2022

(54) OPTICAL UNIT

(71) Applicant: NIDEC SANKYO CORPORATION, Nagano (JP)

(72) Inventors: Shinji Hatano, Nagano (JP); Takeshi Sue, Nagano (JP); Shogo Kasahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/489,763

(22) Filed: Sep. 29, 2021

(65) Prior Publication Data

US 2022/0107549 A1 Apr. 7, 2022

(30) Foreign Application Priority Data

Oct. 2, 2020 (JP) .............................. JP2020-167703

(51) Int. Cl.
*G03B 5/06* (2021.01)
*H04N 5/225* (2006.01)
*H04N 5/232* (2006.01)

(52) U.S. Cl.
CPC ............. *G03B 5/06* (2013.01); *H04N 5/2257* (2013.01); *H04N 5/23287* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS

| 2020/0174273 | A1* | 6/2020 | Minamisawa | ........... G03B 5/06 |
| 2020/0341289 | A1* | 10/2020 | Minamisawa | ........... G02B 7/08 |
| 2021/0041716 | A1* | 2/2021 | Takei | ................... G03B 30/00 |
| 2021/0215900 | A1* | 7/2021 | Sue | ...................... H04N 5/225 |
| 2021/0223663 | A1 | 7/2021 | Minamisawa | |

FOREIGN PATENT DOCUMENTS

WO     2019221038     11/2019

* cited by examiner

*Primary Examiner* — Rodney E Fuller
(74) *Attorney, Agent, or Firm* — JCIPRNET

(57) ABSTRACT

An optical unit includes a movable body with an optical module; a fixed body; a gimbal mechanism having a hole portion through which at least a part of the optical module passes, and serving as a support mechanism that swingably supports the movable body with respect to the fixed body in a direction intersecting an optical axis direction as a pivot axis; and a drive mechanism having a coil and a magnet, and configured to move the movable body with respect to the fixed body. One of the coil and the magnet, as a movable body drive mechanism, is provided on a lateral portion of the movable body in a direction intersecting the optical axis direction. The hole portion is provided with a size such that at least a part of the movable body drive mechanism is visible through the hole portion when viewed from the optical axis direction.

5 Claims, 6 Drawing Sheets

OPTICAL UNIT

CROSS REFERENCE TO RELATED APPLICATION

The present invention claims priority under 35 U.S.C. § 119 to Japanese Application No. 2020-167703 filed Oct. 2, 2020, and the entire content of which is incorporated herein by reference.

BACKGROUND

Field of the Invention

At least an embodiment of the present invention relates to an optical unit.

Description of the Related Documents

Conventionally, optical units have been used that include a movable body provided with an optical module, a fixed body, a support mechanism that swingably supports the movable body with respect to the fixed body in a plurality of directions, and a drive mechanism that moves the movable body supported by the support mechanism with respect to the fixed body. For example, International Publication No. WO 2019/221038A1 discloses an optical unit including a movable body provided with an optical module, a fixed body, a gimbal mechanism that rotatably supports the movable body with respect to the fixed body around a first axis and around a second axis, and a drive mechanism having a coil and a magnet that move the movable body supported by the gimbal mechanism with respect to the fixed body.

However, in a conventionally used optical unit such as the optical unit in International Publication No. WO 2019/221038A1 in which a movable body is swingable with respect to a fixed body in a plurality of directions, the optical unit tends to become large, because the movable body and a gimbal frame of a gimbal mechanism are required to be disposed away from each other to prevent the movable body from coming into contact with the gimbal mechanism when the movable body is caused to swing with respect to the fixed body. The optical unit in International Publication No. WO 2019/221038A1 is provided with a rolling support mechanism that rotatably supports the movable body with respect to the fixed body in an optical axis direction as a rotation axis. However, in the optical unit provided with the rotation support mechanism that rotatably supports the movable body with respect to the fixed body in the optical axis direction as a rotation axis, the optical unit tends to become particularly large depending on a position of the rotation support mechanism. In view of the above, at least an embodiment of the present invention miniaturizes an optical unit having a configuration in which a movable body provided with an optical module is moved with respect to a fixed body by a gimbal mechanism.

SUMMARY

An optical unit according to at least an embodiment of the present invention includes: a movable body provided with an optical module in which a light flux enters; a fixed body; a gimbal mechanism including a gimbal frame provided with a hole portion through which at least a part of the optical module passes and having a spring property, on a side where the light flux enters in an optical axis direction of the optical module with respect to the movable body, and serving as a support mechanism that swingably supports the movable body with respect to the fixed body, while using a direction intersecting the optical axis direction as a pivot axis; and a drive mechanism including a coil and a magnet, and configured to move the movable body supported by the support mechanism with respect to the fixed body. One of the coil and the magnet is provided, as a movable body drive mechanism, on a lateral portion of the movable body in a direction intersecting the optical axis direction, and the other of the coil and the magnet is provided, as a fixed body drive mechanism, at a position of the fixed body opposite to the movable body drive mechanism. The hole portion is provided with a size such that at least a part of the movable body drive mechanism is visible through the hole portion when viewed from the optical axis direction.

According to the present aspect, the gimbal mechanism includes the gimbal frame in which the hole portion is formed, and the hole portion is formed with a size such that at least a part of the movable body drive mechanism is visible through the hole portion when viewed from the optical axis direction. Specifically, the gimbal mechanism is formed with the hole portion with a size such that the movable body drive mechanism provided on a lateral portion of the movable body in a direction intersecting the optical axis direction is visible through the hole portion when viewed from the optical axis direction. Thus, by the large hole portion as described above, it is possible to dispose the gimbal mechanism at a position close to the movable body in the optical axis direction, while suppressing the movable body from coming into contact with the gimbal mechanism when the movable body swings with respect to the fixed body. Therefore, the optical unit can be miniaturized.

In the optical unit according to at least an embodiment of the present invention, the gimbal mechanism may be configured to swingably support the movable body with respect to the fixed body in a plurality of directions, while using a direction intersecting the optical axis direction as a pivot axis, the drive mechanism may include a plurality of the movable body drive mechanisms and the fixed body drive mechanisms, and the hole portion may be provided in all of the plurality of drive mechanisms with a size such that at least a part of the movable body drive mechanism is visible through the hole portion when viewed from the optical axis direction. With this configuration, the optical unit can be miniaturized, while enabling the movable body to move in a particularly wide range with respect to the fixed body.

In the optical unit according to at least an embodiment of the present invention, the gimbal mechanism may be provided with a size such that an end of the gimbal frame is aligned with an outer peripheral surface of the fixed body when viewed from the optical axis direction. With this configuration, it is possible to dispose the gimbal mechanism at a maximum position where the gimbal mechanism does not protrude from the fixed body in a direction intersecting the optical axis direction, and the hole portion can be particularly advantageously made large. Thus, by the particularly large hole portion as described above, it is possible to dispose the gimbal mechanism at a position particularly close to the movable body in the optical axis direction, while suppressing the movable body from coming into contact with the gimbal mechanism when the movable body swings with respect to the fixed body. Thus, the optical unit can be particularly miniaturized.

The optical unit according to at least an embodiment of the present invention may further include a rotation support mechanism provided on a side where the light flux enters in the optical axis direction of the movable body, and configured to rotatably support the movable body with respect to the fixed body in the optical axis direction as a rotation axis. The hole portion of the gimbal mechanism may be provided with a size such that the gimbal frame and the rotation support mechanism do not come into contact with each other, even when the movable body is caused to swing to a maximum extent with respect to the fixed body. With this configuration, it is possible to miniaturize the optical unit, in the optical unit having a configuration in which the rotation support mechanism, which generally tends to become large, is provided on a side where a light flux enters in the optical axis direction of the movable body. Configuring the rotation support mechanism on a side where a light flux enters in the optical axis direction of the movable body makes it easy to form the rotation support mechanism, as compared to a configuration in which the rotation support mechanism is provided inside the movable body, or the like.

In the optical unit according to at least an embodiment of the present invention, the movable body may have a rectangular shape when viewed from the optical axis direction, the hole portion may have an octagonal shape including four first sides corresponding to four directional surfaces of the movable body when viewed from the optical axis direction, and four second sides corresponding to four directional corners of the movable body when viewed from the optical axis direction and located among the four first sides, and the gimbal mechanism may include a connecting portion that is connected to either the fixed body or the movable body, at a position corresponding to the second side of the gimbal frame. With this configuration, it is easy to make the connecting portion thick, and by adjusting the thickness of the connecting portion, a preload required for supporting the fixed body and the movable body by the gimbal mechanism can be easily adjusted.

The optical unit according to at least an embodiment of the present invention having a configuration in which a movable body provided with an optical module is moved with respect to a fixed body by a gimbal mechanism can be miniaturized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

Figure 1:
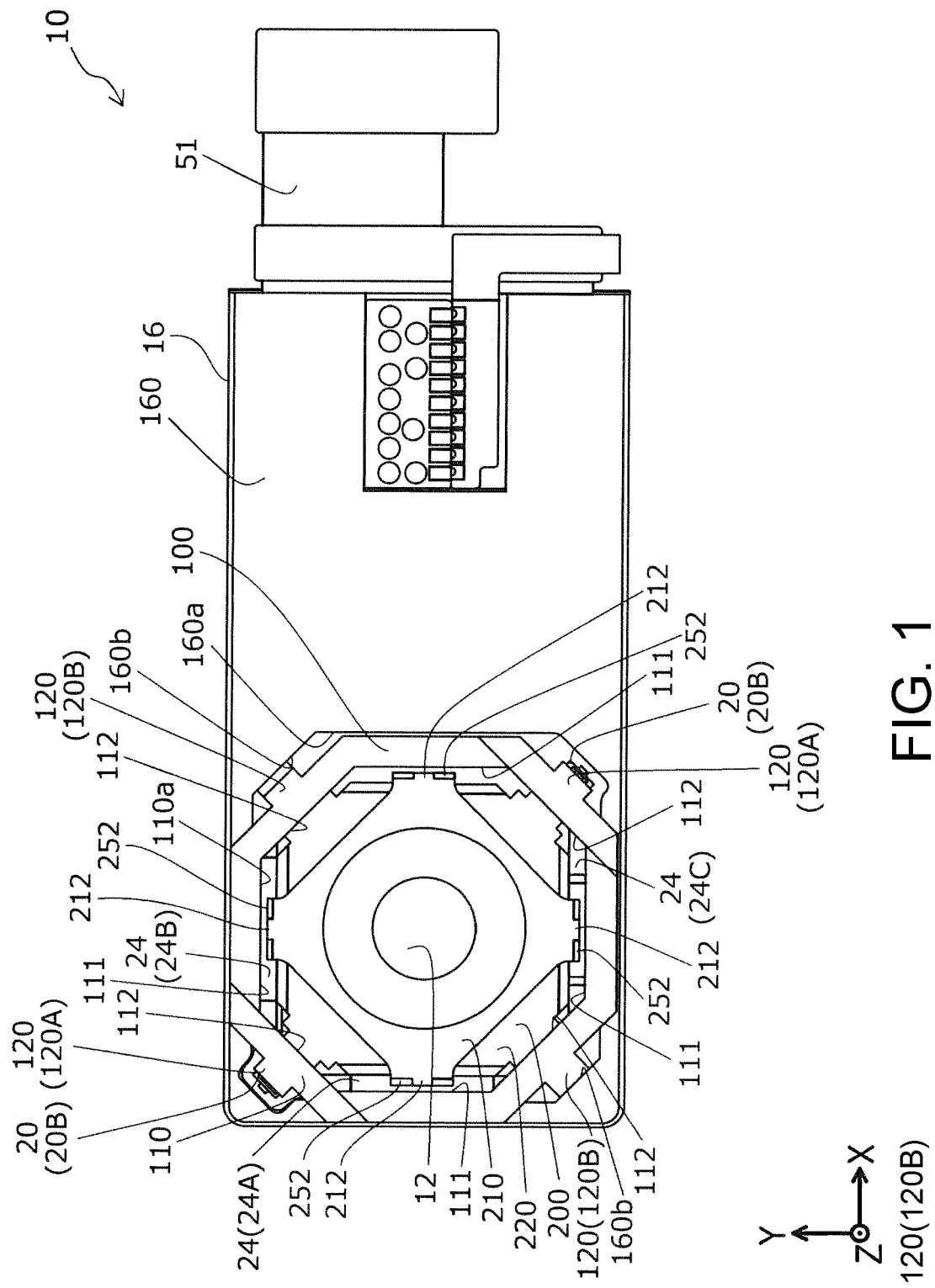
FIG. 1 is a plan view of an optical unit according to one embodiment of the present invention.
Figure 2:
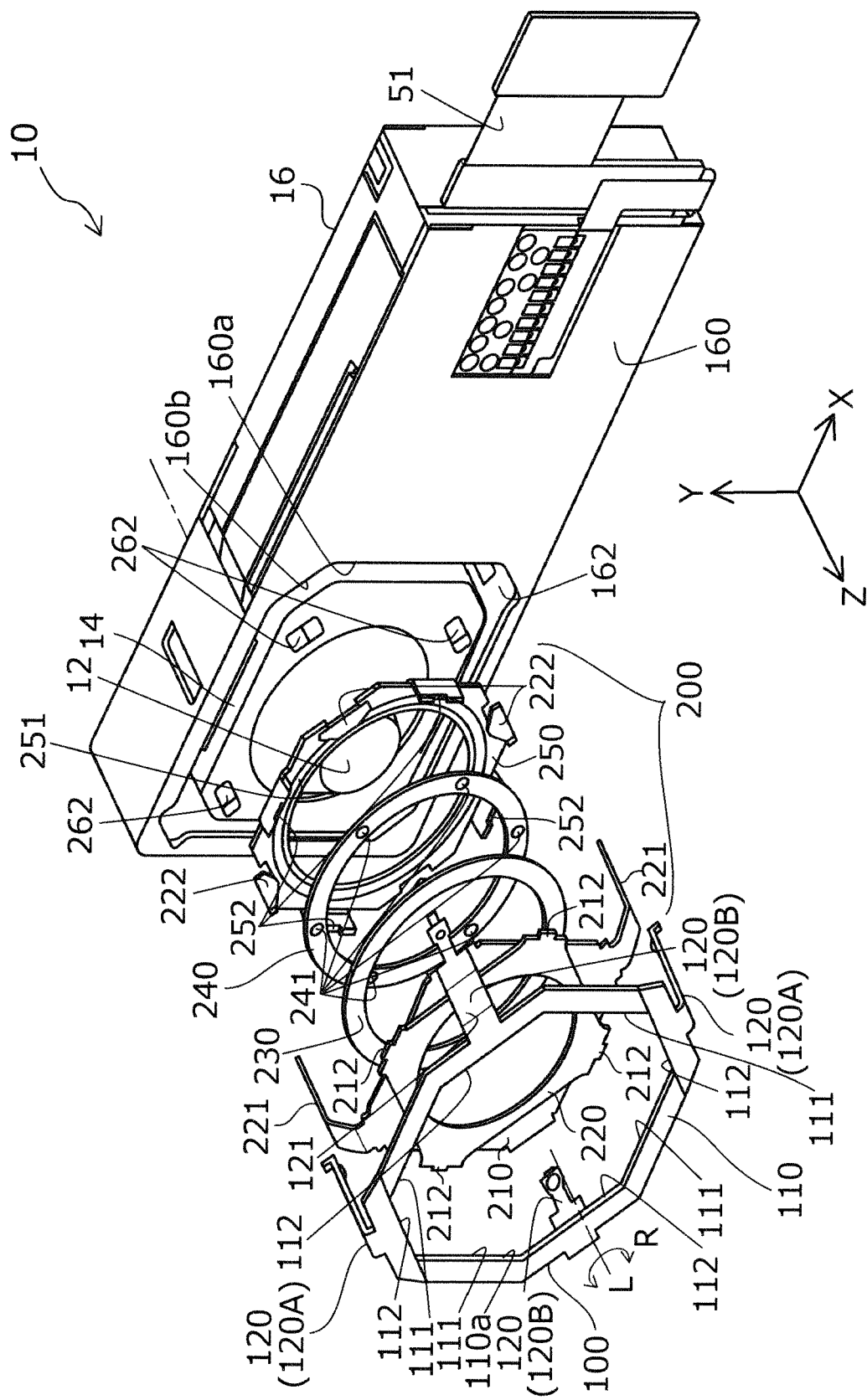
FIG. 2 is an exploded perspective view of the optical unit according to the embodiment of the present invention.
Figure 3:
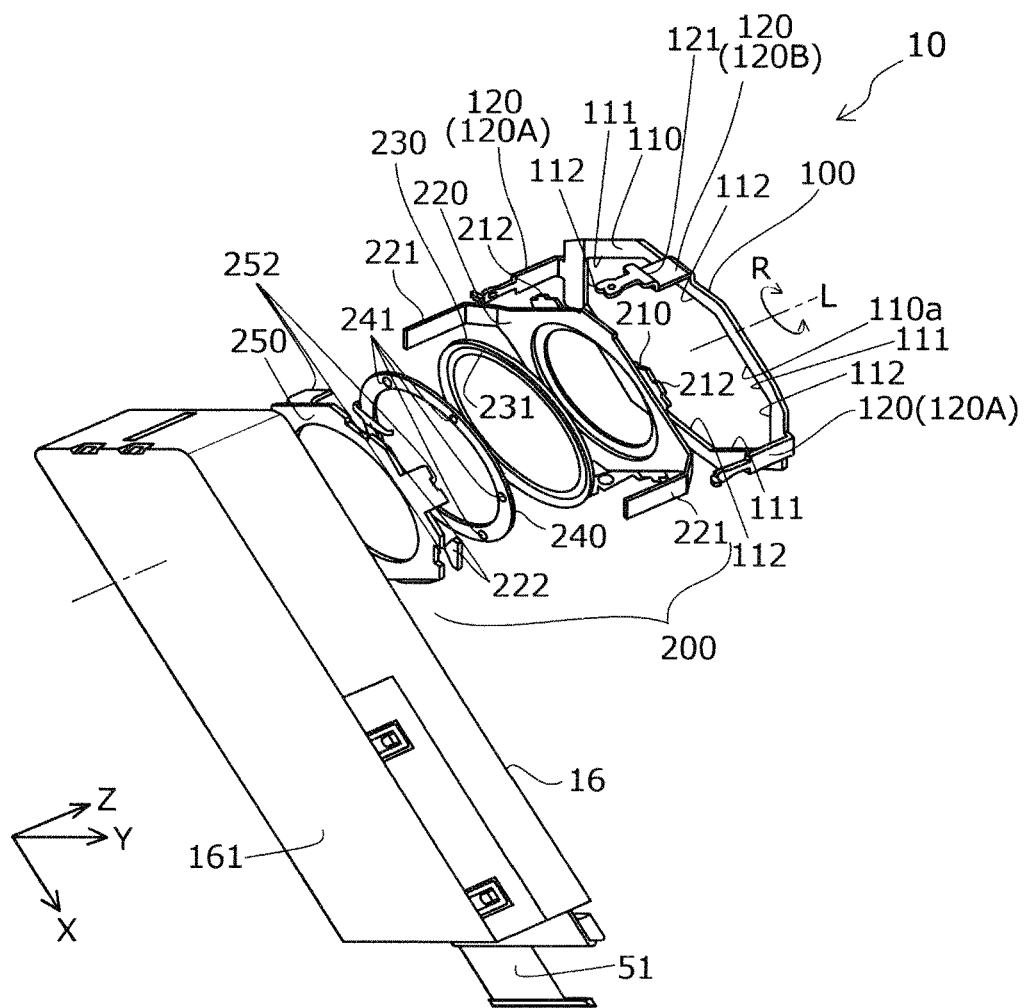
FIG. 3 is an exploded perspective view of the optical unit according to the embodiment of the present invention viewed from a different direction from FIG. 2.

In the following, an embodiment according to the present invention is described based on FIGS. 1 to 6B. In FIGS. 2 and 3, a single-dot chain line appended with a sign L indicates an optical axis. The R direction is a direction around the optical axis. In each of the drawings, the Z-axis direction is an optical axis direction, and is a rolling axis direction. The X-axis direction is a direction intersecting the optical axis, in other words, a yawing axis direction. The Y-axis direction is a direction intersecting the optical axis, in other words, a pitching axis direction. Herein, it is assumed that, in the X-axis direction, the Y-axis direction, and the Z-axis direction, a direction in which the arrow is directed is the + direction, and a direction opposite to the arrow direction is the − direction.

[Overview of Overall Configuration of Optical Unit]

First, an overview of a configuration of an optical unit 10 according to the present embodiment is described. As illustrated in FIG. 1 and the like, the optical unit 10 includes a movable body 14 provided with an optical module 12, and a fixed body 16 that holds the movable body 14 in a state that the movable body 14 is displaceable in a direction (yawing direction) in which the X-axis direction is a rotation axis, a direction (pitching direction) in which the Y-axis direction is a rotation axis, and a direction (rolling direction) in which the Z-axis direction is a rotation axis. The optical unit 10 further includes a drive mechanism 18 that drives (rotates) the movable body 14 with respect to the fixed body 16 in the yawing direction, the pitching direction, and the rolling direction, a gimbal mechanism 100 that rotatably supports the movable body 14 with respect to the fixed body 16 in the pitching direction and the yawing direction, and a rotation support mechanism 200 that rotatably supports the movable body 14 with respect to the fixed body 16 in the rolling direction.

[Optical Module and Movable Body]

Figure 4:
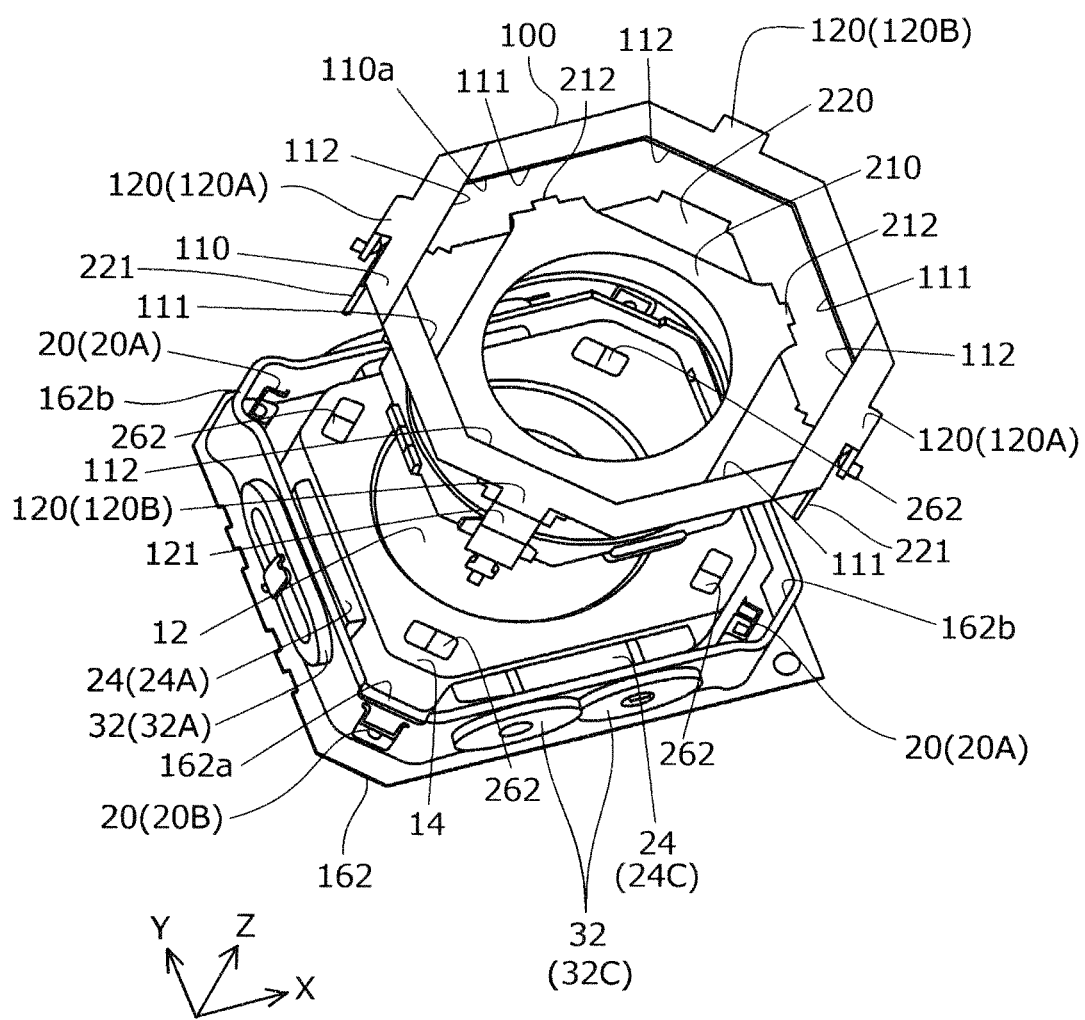
FIG. 4 is an exploded perspective view of components of a peripheral portion of a movable body in the optical unit according to the embodiment of the present invention.

As illustrated in FIGS. 1, 2, and 4, in the present embodiment, the optical module 12 having a lens and the like is formed in the movable body 14 having a substantially rectangular housing shape, and is used, for example, in a thin camera or the like mounted on a mobile phone with a camera, a tablet-type PC, and the like. The optical module 12 includes a lens on the subject side (+Z direction side), and an optical device and the like for performing image capturing is incorporated in a housing having a rectangular housing shape. The optical unit 10 according to the present embodiment, as one example, internally includes an actuator that performs correction of pitching swing (swing in a rotation direction in which the Y-axis direction is a rotation axis), yawing swing (swing in a rotation direction in which the X-axis direction is a rotation axis), and rolling swing (swing in a rotation direction in which the Z-axis direction is a rotation axis) generated in the optical module 12, and is configured to enable correction of pitching swing, correction of yawing swing, and correction of rolling swing. Also, as illustrated in FIG. 4, a magnet 24A, a magnet 24B, and a magnet 24C are attached to the movable body 14.

[Fixed Body]

As illustrated in FIGS. 1 to 4, the fixed body 16 includes an upper side cover portion 160 that covers a part of a component provided inside the fixed body 16 from the +Z direction side, a lower side cover portion 161 that covers a component provided inside the fixed body 16 from the −Z direction side, and a fixing frame 162 that surrounds the movable body 14 inside the fixed body 16. Herein, the upper side cover portion 160 has a substantially rectangular hole portion 160a into which the movable body 14 can be inserted, and a restricting portion 160b that restricts movement of the gimbal mechanism 100 with respect to the fixed body 16 in the +Z direction, at two opposing corners of four corners of the hole portion 160a, by engagement with a step portion 121 of an extended portion 120 (extended portion 120B) of the gimbal mechanism 100 for preventing the gimbal mechanism 100 from coming out of the fixed body 16 in the +Z direction. The fixing frame 162 is provided in such a way as to surround four surfaces of the movable body 14 from the direction (R direction) around the optical axis, which is a direction intersecting the optical axis direction (Z-axis direction).

Further, as illustrated in FIG. 4, a connecting portion 20 (connecting portion 20B) that fixes the extended portion 120 (extended portion 120B) of the gimbal mechanism 100 is fixed at two opposing corners 162a of four corners of the fixing frame 162. A connecting portion 20 (connecting portion 20A) that fixes an extended portion 120 (extended portion 120A) of the gimbal mechanism 100 and an extended portion 221 of the rotation support mechanism 200 is disposed at other two opposing corners 162b of the four corners of the fixing frame 162.

Further, as illustrated in FIG. 4, in the fixing frame 162, a coil 32A is provided at a position opposite to the magnet 24A, a coil 32B is provided at a position opposite to the magnet 24B, and a coil 32C is provided at a position opposite to the magnet 24C. In the present embodiment, the coil 32A, the coil 32B, and the coil 32C are configured as wound coils as one example, but may be a patterned substrate (coil substrate) in which coils are incorporated into a substrate wiring as a pattern.

[Drive Mechanism]

The drive mechanism 18 is constituted of pairs of magnets 24 and coils 32 opposite to the magnets 24. Among the magnets 24, the magnets 24A and the magnets 24B are disposed in such a way that the N-pole and the S-pole are aligned in the Z-axis direction, and the magnets 24C are disposed in such a way that the N-pole and the S-pole are aligned in the X-axis direction. By disposing the magnets 24 with such a layout, in the drive mechanism 18, a pair of the magnet 24A and the coil 32A constitutes a pitching drive mechanism 18A in which the Y-axis direction is a rotation axis, a pair of the magnet 24B and the coil 32B constitutes a yawing drive mechanism 18B in which the X-axis direction is a rotation axis, and a pair of the magnet 24C and the coil 32C constitutes a rolling drive mechanism 18C in which the Z-axis direction is a rotation axis. Herein, the magnets 24A and the magnets 24B are such that the N-pole and the S-pole are aligned one by one, and the coil 32A and the coil 32B are constituted of one coil. On the other hand, the magnets 24C are such that the poles are aligned in the order of the S-pole, the N-pole, and the S-pole, and the coil 32C is constituted of two coils. However, there is no particular limitation to the configuration of magnets and the configuration of coils.

In the drive mechanism 18 according to the present embodiment, the magnets 24A, 24B, and 24C are formed in the movable body 14, and the coils 32A, 32B, and 32C are formed in the fixed body 16. Alternatively, the magnets 24A, 24B, and 24C may be formed in the fixed body 16, and the coils 32A, 32B, and 32C may be formed in the movable body 14. The optical unit 10 according to the present embodiment includes the pitching drive mechanism 18A, the yawing drive mechanism 18B, and the rolling drive mechanism 18C, as the drive mechanism 18, but may be configured to include only one or two of these mechanisms.

Correction of pitching, yawing and rolling is performed as follows. When swing occurs in the optical unit 10 in at least one of the pitching direction, the yawing direction, and the rolling direction, the swing is detected by a magnetic sensor (Hall element), and the drive mechanism 18 is driven based on a result of the detection. Alternatively, the swing of the optical unit 10 may be detected by using a swing detection sensor (gyroscope) or the like. The drive mechanism 18 acts in such a way as to correct the swing, based on a detection result of the swing. Specifically, electric current is caused to flow through each of the coils 32A, 32B, and 32C in such a way as to move the movable body 14 in a direction that cancels the swing of the optical unit 10, thereby correcting the swing.

In this way, the optical unit 10 according to the present embodiment includes the drive mechanism 18 that rotates the movable body 14 with respect to the fixed body 16 in the pitching axis direction, the yawing axis direction, and the rolling axis direction as rotation axes. Herein, the drive mechanism 18 is preferably disposed at a position other than the side (+X direction side) where a flexible wiring substrate 51 is disposed in the X-axis direction with respect to the movable body 14. This is because the drive mechanism 18 can be disposed on a side where the flexible wiring substrate 51 is not formed, and therefore, the optical unit 10 does not need to be made large in order to suppress contact between the drive mechanism 18 and the flexible wiring substrate 51, and the optical unit 10 can be miniaturized. The term "rotation" in the present specification does not require 360° rotation, but includes a case where the optical unit swings in a rotation direction.

[Gimbal Mechanism]

Figure 5:
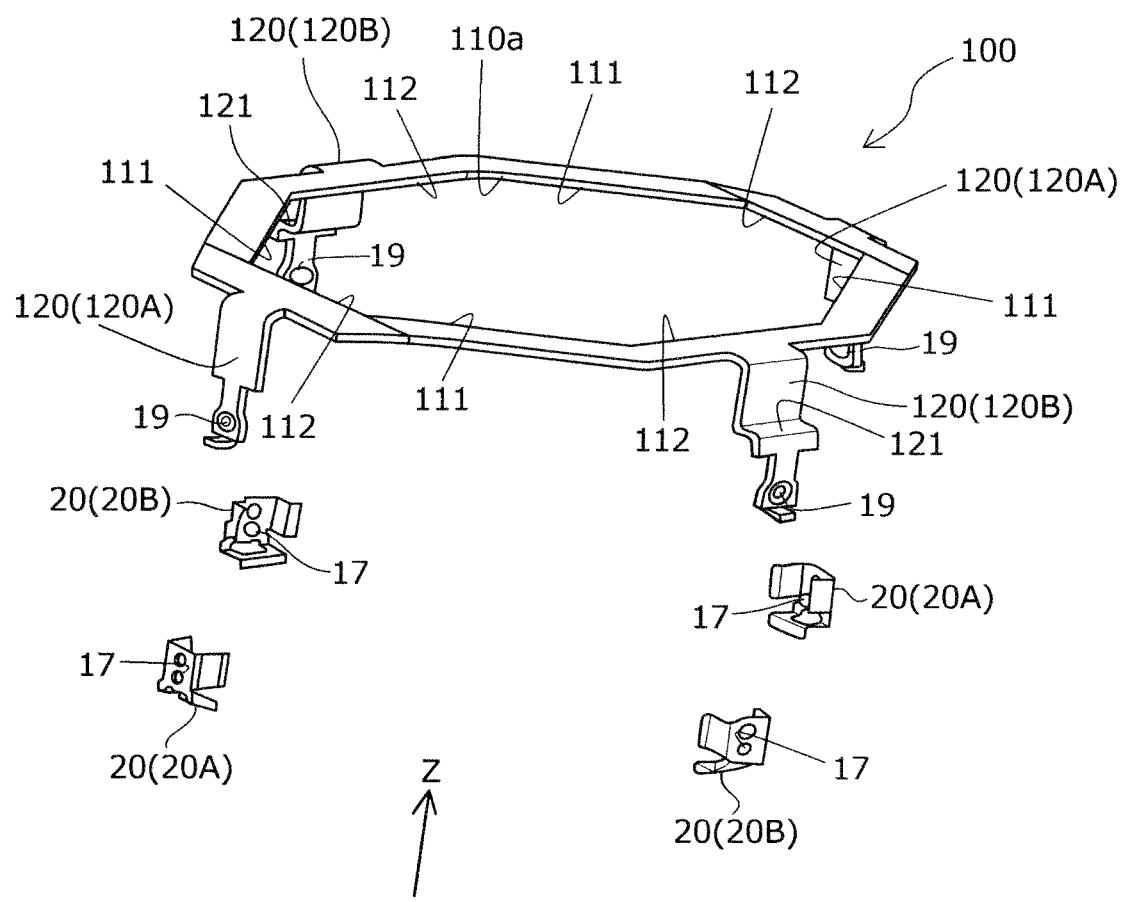
FIG. 5 is a perspective view of a gimbal mechanism and a connecting portion of the optical unit according to the embodiment of the present invention.

As illustrated in FIGS. 1 to 5, the gimbal mechanism 100 includes a gimbal frame 110 having a substantially octagonal frame shape when viewed from the optical axis direction and having a spring property, and the extended portion 120 formed on a portion corresponding to every other side of the substantially octagonal gimbal frame 110. The extended portion 120 includes the extended portion 120A connected to the connecting portion 20A fixed to the extended portion 221 of the rotation support mechanism 200, and the extended portion 120B connected to the connecting portion 20B fixed to the fixing frame 162 of the fixed body 16. As illustrated in FIG. 5, the step portion 121 is formed on the extended portion 120B of the extended portion 120. However, as described above, the step portion 121 is formed on the gimbal mechanism 100, and the restricting portion 160b is formed at a position, on the upper side cover portion 160 of the fixed body 16 where the restricting portion 160b overlaps the step portion 121 in the Z-axis direction, thereby preventing the gimbal mechanism 100 from coming out of the fixed body 16 in the +Z direction.

As illustrated in FIG. 5, a convex spherical surface 17 that is formed by fixing a spherical member inwardly is formed on each of the connecting portions 20, and a concave curved surface 19 that is recessed inwardly is formed in each of the extended portions 120. Each of the extended portions 120 has a spring property so as to apply a preload in such a way as to spread outwardly, and by fitting the concave curved surface 19 into the convex spherical surface 17 from inside, the gimbal mechanism 100 is swingably supported with respect to the connecting portion 20. As described above, the gimbal frame 110 has a spring property, and the drive mechanism 18 has the pitching drive mechanism 18A and the yawing drive mechanism 18B. Therefore, the gimbal mechanism 100 is swingable with respect to the fixed body in the pitching axis direction (Y-axis direction) and the yawing axis direction (X-axis direction) as pivot axes.

As described above, in the optical unit 10 according to the present embodiment, the extended portion 120B of the gimbal mechanism 100 is fixed to the fixed body 16 by the connecting portion 20B, and the extended portion 120A of the gimbal mechanism 100 is fixed to the extended portion 221 of the rotation support mechanism 200 by the connecting portion 20A. As will be described in detail below, the rotation support mechanism 200 is configured to rotatably support the movable body 14 with respect to the gimbal mechanism 100 in the rolling axis direction (Z-axis direction) as a rotation axis. With this configuration, the optical unit 10 according to the present embodiment is configured in such a way that the movable body 14 is movable with respect to the fixed body 16 in the pitching axis direction (Y-axis direction), the yawing axis direction (X-axis direction), and the rolling axis direction (Z-axis direction) as rotation axes (pivot axes) via the gimbal mechanism 100 and the rotation support mechanism 200.

Figure 6A:
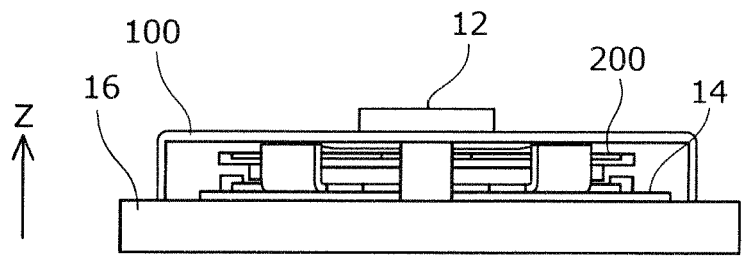
FIGS. 6A and 6B are side views of components of a peripheral portion of the movable body in the optical unit according to the embodiment of the present invention.
Figure 6B:
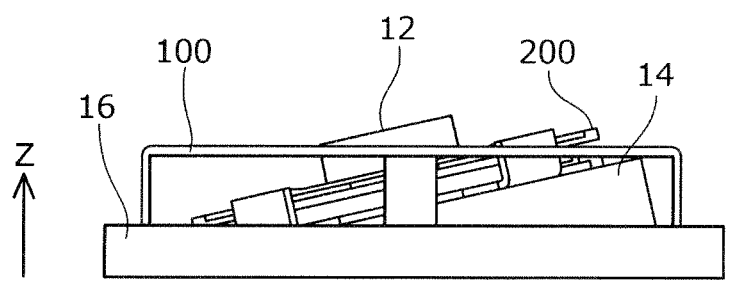

The gimbal frame 110 has a hole portion 110a through which a part of the optical module 12 passes, and as illustrated in FIG. 1, the hole portion 110a has a size such that any of the magnets 24A, 24B, and 24C are visible through the hole portion 110a when viewed from the optical axis direction (Z-axis direction). The optical unit 10 according to the present embodiment having the hole portion 110a of such a size has a configuration in which the movable body 14 does not come into contact with the gimbal mechanism 100, even when the movable body 14 is tilted with respect to the fixed body 16. Herein, FIG. 6A illustrates a state in which the movable body 14 is not tilted with respect to the fixed body 16, and FIG. 6B illustrates a state in which the movable body 14 is tilted to a maximum extent with respect to the fixed body 16. As illustrated in FIG. 6B, even when the movable body 14 is tilted to a maximum extent with respect to the fixed body 16, the movable body 14 and a component (the rotation support mechanism 200 according to the present embodiment) disposed on the movable body 14 pass through the hole portion 110a, and do not come into contact with the gimbal mechanism 100.

[Rotation Support Mechanism]

As illustrated in FIGS. 2 to 4, the rotation support mechanism 200 includes an upper side cover plate 210. The rotation support mechanism 200 further includes a plate roll body 220 with the extended portion 221 to which the connecting portion 20A is fixed for being connected to the extended portion 120A of the gimbal frame 110. The rotation support mechanism 200 further includes an annular plate 230 that is fixed to the plate roll body 220, and has a first annular groove 231 formed into a circular shape in a direction (R direction) around the optical axis. The rotation support mechanism 200 further includes a retainer 240 that keeps a plurality of spherical members 241 disposed at a position facing the first annular groove 231 at a predetermined interval. The rotation support mechanism 200 further includes a lower side cover plate 250 that is fixed to the movable body 14, and has a second annular groove 251 formed into a circular shape in a direction around the optical axis, at a position facing the first annular groove 231.

The upper side cover plate 210 and the lower side cover plate 250 are fixed by engagement of an engaging portion 212 formed on the upper side cover plate 210 and an engaged portion 252 formed in the lower side cover plate 250. Since the annular plate 230 having the first annular groove 231, the retainer 240 that keeps the plurality of spherical members 241 at a predetermined interval, and the lower side cover plate 250 constitute a bearing mechanism, the plate roll body 220 to which the annular plate 230 is fixed is rotated with respect to the upper side cover plate 210 and the lower side cover plate 250 in a direction around the optical axis. Since the lower side cover plate 250 is fixed to the movable body 14, and the plate roll body 220 is fixed to the fixed body 16 via the gimbal mechanism 100, the movable body 14 is rotatable with respect to the gimbal mechanism 100 in the rolling axis direction (Z-axis direction) as a rotation axis, and is also rotatable with respect to the fixed body 16 in the rolling axis direction as a rotation axis.

As illustrated in FIGS. 2 and 4, a magnet 262 is provided near each of four corners of the substantially rectangular movable body 14 when viewed from the optical axis direction. In addition, a magnetic member 222 is provided on the plate roll body 220 at a position facing each of the magnets 262. With this configuration, the magnets 262 and the magnetic members 222 constitute a magnetic spring that attracts one another, and the origin position of the rolling axis direction of the movable body 14 with respect to the fixed body 16 is automatically adjusted.

To summarize, the optical unit 10 according to the present embodiment includes the movable body 14 provided with the optical module 12 into which a light flux enters, and the fixed body 16. The optical unit 10 further includes the gimbal mechanism 100 provided with the gimbal frame 110 having the hole portion 110a through which at least a part of the optical module 12 passes and having a spring property, on a side (+Z direction side) where the light flux enters in the optical axis direction of the optical module 12 with respect to the movable body 14, and serving as a support mechanism that swingably supports the movable body 14 with respect to the fixed body 16 in directions (X-axis direction and Y-axis direction) intersecting the optical axis direction (Z-axis direction) as pivot axes. The optical unit 10 further includes the rotation support mechanism 200 as a support mechanism different from the gimbal mechanism 100. In addition, the optical unit 10 includes the drive mechanism 18 having the coil 32 and the magnet 24, and configured to move the movable body 14 supported by the support mechanism with respect to the fixed body 16. Herein, the optical unit 10 according to the present embodiment includes, in the drive mechanism 18, the magnet 24 as a movable body drive mechanism provided on a lateral portion of the movable body 14 in a direction intersecting the optical axis direction, and the coil 32 as a fixed body drive mechanism provided at a position of the fixed body 16 opposite to the movable body drive mechanism. Alternatively, the optical unit 10 may include a coil 32 as a movable body drive mechanism, and a magnet 24 as a fixed body drive mechanism. The hole portion 110a formed in the gimbal frame 110 is formed with a size such that at least a part of the movable body drive mechanism (the magnet 24) is visible through the hole portion 110a when viewed from the optical axis direction.

In this way, in the optical unit 10 according to the present embodiment, the gimbal mechanism 100 includes the gimbal frame 110 in which the hole portion 110a is formed, and the hole portion 110a is formed with a size such that at least a part of the movable body drive mechanism is visible through the hole portion 110a when viewed from the optical axis direction. Specifically, the hole portion 110a is formed in the gimbal mechanism 100 with a size such that the movable body drive mechanism provided on a lateral portion of the movable body 14 in a direction intersecting the optical axis direction is visible through the hole portion 110a when viewed from the optical axis direction. By the large hole portion 110a as described above, it is possible to dispose the gimbal mechanism 100 at a position close to the movable body 14 in the optical axis direction, while suppressing the movable body 14 from coming into contact with the gimbal mechanism 100 when the movable body 14 swings with respect to the fixed body 16. Therefore, the optical unit 10 can be miniaturized by employing the above-described configuration.

Also, as described above, in the optical unit 10 according to the present embodiment, the gimbal mechanism 100 swingably supports the movable body 14 with respect to the fixed body 16 in a plurality of directions (the X-axis direction and the Y-axis direction), while using a direction intersecting the optical axis direction as a pivot axis, and the drive mechanism 18 includes a plurality of the magnets 24 being a movable body drive mechanism, and the coils 32 being a fixed body drive mechanism (three magnets 24A, 24B, and 24C for the magnets 24, and three coils 32A, 32B, and 32C for the coils 32). As illustrated in FIG. 1, the hole portion 110a is formed in all of the plurality of drive mechanisms 18 with a size such that at least a part of the movable body drive mechanism (magnets 24A, 24B, and 24C for the magnets 24) is visible through the hole portion 110a when viewed from the optical axis direction. With this configuration, the optical unit 10 according to the present embodiment is miniaturized, while enabling the movable body 14 to move in a particularly wide range with respect to the fixed body 16.

Herein, as illustrated in FIG. 1, in the optical unit 10 according to the present embodiment, the gimbal mechanism 100 is provided in such a way that ends of the gimbal frame 110 on the −X direction side, the +Y direction side, and the −Y direction side when viewed from the optical axis direction have a size such that the ends are positioned to align with an outer peripheral surface of the fixed body 16. With this configuration, it is possible to dispose the gimbal mechanism 100 at a maximum position where the gimbal mechanism 100 does not protrude from the fixed body 16 in a direction intersecting the optical axis direction, and the hole portion 110a is particularly advantageously made large. Therefore, by the particularly large hole portion 110a as described above, the optical unit 10 according to the present embodiment enables disposing the gimbal mechanism 100 at a position particularly close to the movable body 14 in the optical axis direction, while suppressing the movable body 14 from coming into contact with the gimbal mechanism 100 when the movable body 14 swings with respect to the fixed body 16. This enables particularly miniaturizing the optical unit 10. The term "position to align with an outer peripheral surface" includes a position generally aligned with an outer peripheral surface, in addition to a position completely aligned with an outer peripheral surface at a reference position where the movable body 14 does not swing with respect to the fixed body 16.

Herein, the optical unit 10 according to the present embodiment includes the rotation support mechanism 200 that rotatably supports the movable body 14 with respect to the fixed body 16 in the optical axis direction as a rotation axis, on a side (+Z direction side) where a light flux enters in the optical axis direction of the movable body 14. The gimbal mechanism 100 is formed with the hole portion 110a with a size such that the gimbal frame 110 and the rotation support mechanism 200 do not come into contact with each other, even when the movable body 14 is caused to swing to a maximum extent with respect to the fixed body 16. With this configuration, the optical unit 10 according to the present embodiment enables miniaturizing the optical unit 10, in the optical unit 10 having a configuration in which the rotation support mechanism 200, which generally tends to become large, is provided on a side where a light flux enters in the optical axis direction of the movable body 14. Configuring the rotation support mechanism 200 on a side where a light flux enters in the optical axis direction of the movable body 14 makes it easy to form the rotation support mechanism 200, as compared to a configuration in which the rotation support mechanism 200 is provided inside the movable body 14, or the like.

Also, as illustrated in FIG. 1 and the like, in the optical unit 10 according to the present embodiment, the movable body 14 has a rectangular shape when viewed from the optical axis direction. Also, the hole portion 110a has an octagonal shape including four first sides 111 corresponding to four directional surfaces of the movable body 14 viewed from the optical axis direction, and four second sides 112 corresponding to four directional corners of the movable body 14 viewed from the optical axis direction and located among the four first sides 111. The gimbal mechanism 100 includes, at a position corresponding to the second side 112 of the gimbal frame 110, the extended portion 120 being a connecting portion to be connected to either the fixed body 16 or the movable body 14. With this configuration, the optical unit 10 according to the present embodiment makes it easy to make the extended portion 120 thick, and by adjusting the thickness of the extended portion 120, a preload required for supporting the fixed body 16 and the movable body 14 by the gimbal mechanism 100 can be easily adjusted. The term "connecting to either the fixed body 16 or the movable body 14" includes connecting to either the fixed body 16 or the movable body 14 via another member (e.g., the rotation support mechanism 200 according to the present embodiment), in addition to connecting directly to either the fixed body 16 or the movable body 14.

The present invention is not limited to the above-described embodiment, and can be achieved by various configurations as far as the configurations do not depart from the gist of the present invention. For example, technical features in the embodiment associated with technical features in each aspect described in Summary of the Invention can be replaced or combined as necessary to solve a part or all of the above-described problems, or to achieve a part or all of the above-described advantageous effects. Also, as far as the technical features are not described as essential ones in the present specification, they can be deleted as necessary.

What is claimed is:

1. An optical unit comprising:
    a movable body, provided with an optical module in which a light flux enters;
    a fixed body;
    a gimbal mechanism, comprising a gimbal frame provided with a hole portion through which at least a part of the optical module passes and having a spring property, on a side where the light flux enters in an optical axis direction of the optical module with respect to the movable body, and serving as a support mechanism that swingably supports the movable body with respect to the fixed body, while using a direction intersecting the optical axis direction as a pivot axis; and
    a drive mechanism, comprising a coil and a magnet, and the drive mechanism being configured to move the movable body supported by the support mechanism with respect to the fixed body, wherein
one of the coil and the magnet is provided, as a movable body drive mechanism, on a lateral portion of the movable body in a direction intersecting the optical axis direction,
the other of the coil and the magnet is provided, as a fixed body drive mechanism, at a position of the fixed body opposite to the movable body drive mechanism, and
the hole portion is provided with a size such that at least a part of the movable body drive mechanism is visible through the hole portion when viewed from the optical axis direction.

2. The optical unit according to claim 1, wherein
the gimbal mechanism is configured to swingably support the movable body with respect to the fixed body in a plurality of directions, while using a direction intersecting the optical axis direction as a pivot axis,
the drive mechanism comprises a plurality of the movable body drive mechanisms and the fixed body drive mechanisms, and
the hole portion is provided in all of the plurality of drive mechanisms with a size such that at least a part of the movable body drive mechanism is visible through the hole portion when viewed from the optical axis direction.

3. The optical unit according to claim 1, wherein
the gimbal mechanism is provided with a size such that an end of the gimbal frame is aligned with an outer peripheral surface of the fixed body when viewed from the optical axis direction.

4. The optical unit according to claim 1, further comprising:
a rotation support mechanism, provided on a side where the light flux enters in the optical axis direction of the movable body, and the rotation support mechanism being configured to rotatably support the movable body with respect to the fixed body in the optical axis direction as a rotation axis,
wherein
the hole portion of the gimbal mechanism is provided with a size such that the gimbal frame and the rotation support mechanism do not come into contact with each other, even when the movable body is caused to swing to a maximum extent with respect to the fixed body.

5. The optical unit according to claim 1, wherein
the movable body has a rectangular shape when viewed from the optical axis direction,
the hole portion has an octagonal shape comprising four first sides corresponding to four directional surfaces of the movable body when viewed from the optical axis direction, and four second sides corresponding to four directional corners of the movable body when viewed from the optical axis direction and located among the four first sides, and
the gimbal mechanism comprises a connecting portion that is connected to either the fixed body or the movable body, at a position corresponding to the second side of the gimbal frame.

* * * * *